(12) United States Patent
Buckingham et al.

(10) Patent No.: US 11,924,203 B1
(45) Date of Patent: *Mar. 5, 2024

(54) SYSTEMS AND METHODS FOR SECURE LOGON

(71) Applicant: United Services Automobile Association (USAA), San Antonio, TX (US)

(72) Inventors: Thomas B. Buckingham, Fair Oaks Ranch, TX (US); Richard A. Davey, San Antonio, TX (US); Tammy Sanclemente, Helotes, TX (US); Ryan M. Johnson, San Antonio, TX (US); Adam J. Leatham, Selma, TX (US); Christopher Thomas Wilkinson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,215

(22) Filed: Mar. 30, 2023

Related U.S. Application Data

(63) Continuation of application No. 17/530,286, filed on Nov. 18, 2021, now Pat. No. 11,658,968, which is a
(Continued)

(51) Int. Cl.
*H04L 9/40* (2022.01)
*G06F 21/34* (2013.01)
(Continued)

(52) U.S. Cl.
CPC .......... *H04L 63/0861* (2013.01); *G06F 21/34* (2013.01); *G06F 21/41* (2013.01);
(Continued)

(58) Field of Classification Search
CPC ............ H04L 63/0861; H04L 63/0815; H04L 63/083; H04L 63/0838; H04L 63/0853;
(Continued)

(56) References Cited

U.S. PATENT DOCUMENTS

| 6,052,468 A | 4/2000 | Hillhouse |
|---|---|---|
| 8,281,372 B1 | 10/2012 | Vidal |

(Continued)

OTHER PUBLICATIONS

Bardram et al., Context-Aware User Authentication—Supporting Proximity-Based Login in Pervasive Computing, 2003, pp. 107-123.

(Continued)

*Primary Examiner* — Thaddeus J Plecha
(74) *Attorney, Agent, or Firm* — BakerHostetler

(57) ABSTRACT

The present disclosure provides methods and systems for secure logon. One or more method includes: determining, via authentication information provided by a user of an electronic device, that the user is authorized to access an online account provided by the online account provider; providing the user with a selectable option to enable an expedited logon process by which the user can access the online account by solely providing a particular authentication item of the user; receiving a verification credential in response to a next logon attempt using the expedited logon process; and verifying that the received verification credential matches an assigned verification credential provided to the user for use in conjunction with the next logon attempt using the expedited logon process.

20 Claims, 6 Drawing Sheets

Related U.S. Application Data continuation of application No. 16/887,891, filed on May 29, 2020, now Pat. No. 11,212,278, which is a continuation of application No. 16/398,072, filed on Apr. 29, 2019, now Pat. No. 10,708,264, which is a continuation of application No. 15/877,377, filed on Jan. 22, 2018, now Pat. No. 10,320,783, which is a continuation of application No. 14/678,178, filed on Apr. 3, 2015, now Pat. No. 9,876,789, which is a continuation of application No. 13/036,945, filed on Feb. 28, 2011, now Pat. No. 9,021,562.

(60) Provisional application No. 61/308,710, filed on Feb. 26, 2010.

(51) Int. Cl.
*G06F 21/41* (2013.01)
*H04L 9/32* (2006.01)
*G06F 21/31* (2013.01)

(52) U.S. Cl.
CPC ........ *H04L 9/3226* (2013.01); *H04L 63/0815* (2013.01); *H04L 63/083* (2013.01); *H04L 63/0838* (2013.01); *H04L 63/0853* (2013.01); *G06F 21/31* (2013.01); *H04L 2463/082* (2013.01)

(58) Field of Classification Search
CPC ............ H04L 9/3226; H04L 2463/082; G06F 21/34; G06F 21/31; G06F 21/41
See application file for complete search history.

(56) References Cited

U.S. PATENT DOCUMENTS

| | | |
|---|---|---|
| 9,021,562 B1 | 4/2015 | Buckingham |
| 9,794,242 B2 | 10/2017 | Dou |
| 9,876,789 B1 | 1/2018 | Buckingham |
| 10,320,783 B1 | 6/2019 | Buckingham |
| 10,708,264 B1 | 7/2020 | Buckingham |
| 11,212,278 B1 | 12/2021 | Buckingham |
| 2002/0031230 A1 | 3/2002 | Sweet |
| 2005/0038994 A1 | 2/2005 | Johnson |
| 2006/0225130 A1 | 10/2006 | Chen |
| 2007/0118745 A1 | 5/2007 | Buer |
| 2007/0130463 A1 | 6/2007 | Law |
| 2007/0180504 A1 | 8/2007 | Hung |
| 2008/0015986 A1 | 1/2008 | Wright |
| 2008/0104507 A1 | 5/2008 | Nurmi |
| 2008/0134307 A1 | 6/2008 | Ashkenazi |
| 2008/0162366 A1 | 7/2008 | Bedier |
| 2009/0205036 A1 | 8/2009 | Slaton |
| 2009/0271621 A1 | 10/2009 | Mendelovich |
| 2009/0282467 A1 | 11/2009 | Schenk |
| 2009/0328182 A1 | 12/2009 | Malakapalli |
| 2010/0180328 A1 | 7/2010 | Moas |
| 2010/0199336 A1 | 8/2010 | Tan |
| 2011/0055913 A1 | 3/2011 | Wong |
| 2011/0138176 A1 | 6/2011 | Mansour |
| 2011/0162053 A1 | 6/2011 | Pei |
| 2012/0131656 A1 | 5/2012 | Slaton |
| 2014/0157390 A1* | 6/2014 | Lurey .................... G06F 21/31 726/7 |
| 2016/0116510 A1 | 4/2016 | Kalous |
| 2017/0109998 A1 | 4/2017 | Warren |
| 2020/0329025 A1 | 10/2020 | Kahn |
| 2021/0250343 A1 | 8/2021 | Soriano |

OTHER PUBLICATIONS

Aloul et al., Two Factor Authentication Using Mobile Phones, 2009, pp. 641-644.

* cited by examiner

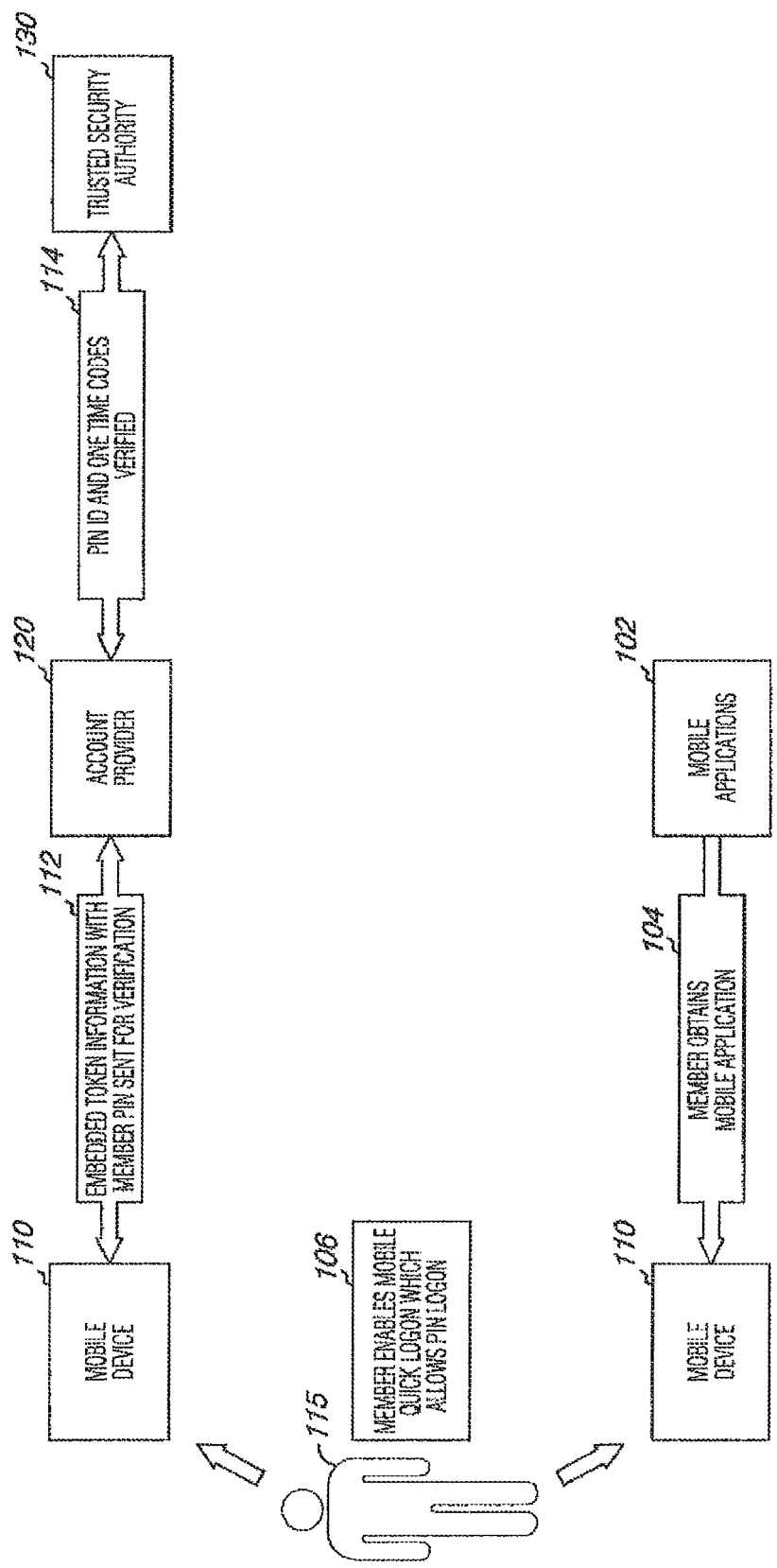

SYSTEMS AND METHODS FOR SECURE LOGON

CROSS-REFERENCE TO RELATED APPLICATION

This application is a Continuation of U.S. patent application Ser. No. 17/530,286 filed on Nov. 18, 2021, which is a Continuation of U.S. patent application Ser. No. 16/887,891 filed on May 29, 2020, now U.S. Pat. No. 11,212,278 filed on Dec. 28, 2021, which is a Continuation of U.S. patent application Ser. No. 16/398,072 filed on Apr. 29, 2019, now U.S. Pat. No. 10,708,264 filed on Jul. 7, 2020, which is a Continuation of U.S. patent application Ser. No. 15/877,377 filed on Jan. 22, 2018, now U.S. Pat. No. 10,320,783 filed on Jun. 11, 2019, which is a Continuation of U.S. patent application Ser. No. 14/678,178 filed on Apr. 3, 2015, now U.S. Pat. No. 9,876,789 filed on Jan. 23, 2018, which is a Continuation of U.S. patent application Ser. No. 13/036,945 filed on Feb. 28, 2011, now U.S. Pat. No. 9,021,562 filed on Apr. 28, 2015, this patent application claims priority to and the benefit of U.S. Provisional Patent Application No. 61/308,710 filed on Feb. 26, 2010, which is incorporated herein by reference in its entirety.

Accessing services via web-based applications is an expected convenience for many individuals. As such, various financial institutions offer members and/or customers online access to financial services. These individuals are often allowed 24-hour access to services, such as online account management, offered by the respective institution via portable electronic devices such as laptop computers, personal digital assistants (PDAs), cellular telephones, smartphones, etc.

Security associated with online banking, for example, is a concern for both the financial institutions and their customers. As such, various authentication procedures can be implemented to offer levels of assurance as to the identity of an individual. For instance, in order to logon to an online account, an individual may be asked to provide logon credentials such as an online user ID and password associated with the online account. Additional security can be provided via use of personal identification numbers (PINs) or hardware and/or software based security tokens.

In order to simplify the logon procedure, some electronic devices "remember" an individual's logon credentials (e.g., authentication information), For example, an individual's online user ID and/or password can be stored on the electronic device. However, remembering an individual's credentials in this manner can have various drawbacks. As an example, storing such logon credentials locally on the electronic device can expose the individual to security compromises via "hacking," for instance.

BRIEF DESCRIPTION OF THE DRAWINGS

FIG. 1 illustrates a method for providing secure logon according to an embodiment of the present disclosure.

DETAILED DESCRIPTION

Figure 2A:
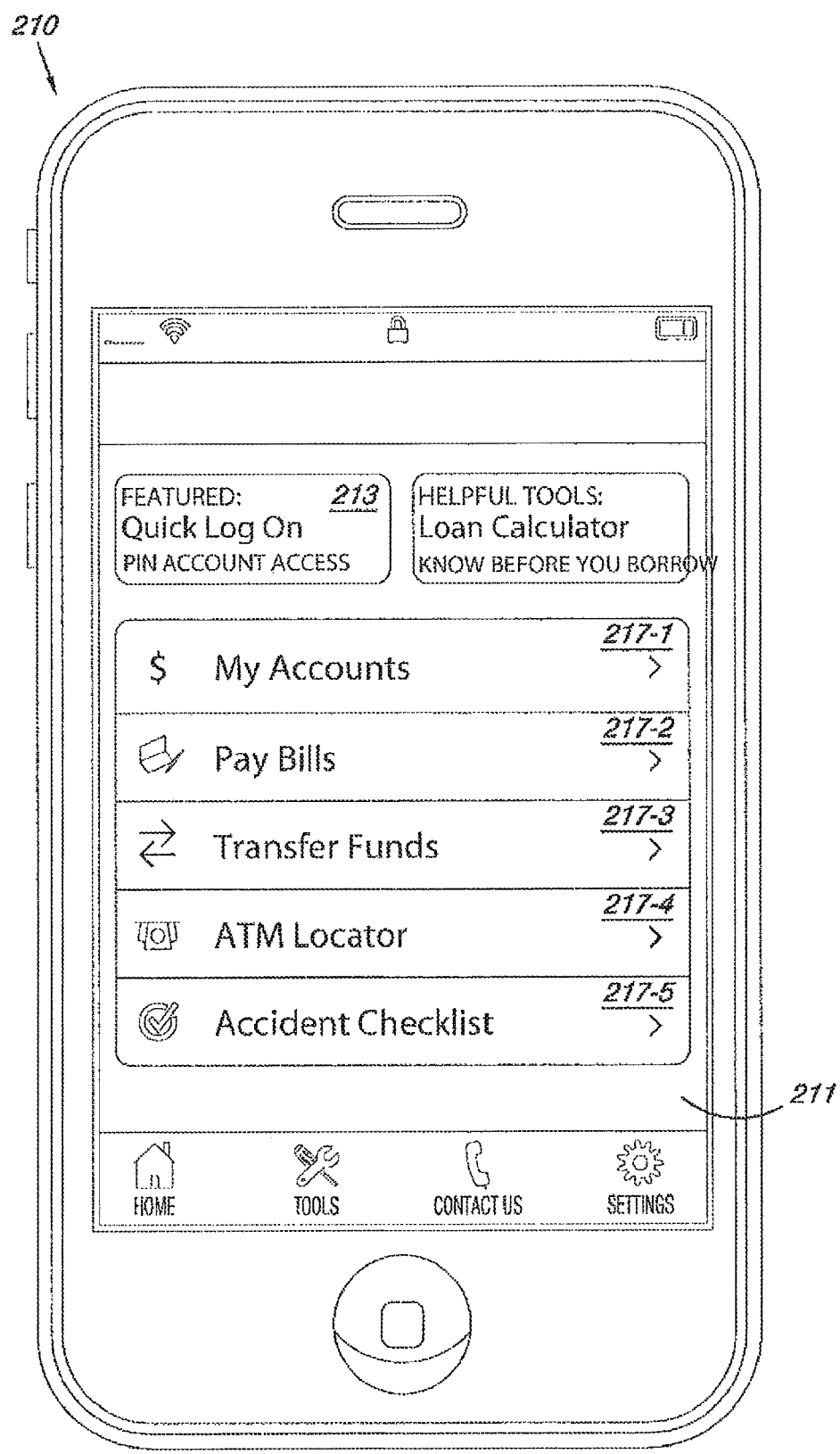
FIGS. 2A-2C illustrate an electronic device for providing secure logon in accordance with one or more embodiment of the present disclosure.

The present disclosure provides methods and systems for secure logon. One or more embodiments include: determining, via authentication information provided by a user of an electronic device, that the user is authorized to access an on line account provided by an online account provider; providing the user with a selectable option to enable and/or disable a logon process by which the user can access the online account by solely providing a particular authentication item of the user; providing the user with an assigned verification credential for use in conjunction with a next logon attempt using the enabled logon process; receiving a verification credential in response to the next logon attempt; verifying that the received verification credential matches the assigned verification credential provided to the user; and providing the user with an updated assigned verification credential for use in conjunction with a subsequent logon attempt using the enabled logon process.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N," particularly with respect to reference numerals in the drawings, indicates that a number of the particular feature so designated can be included with one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1 illustrates a method for providing secure logon according to an embodiment of the present disclosure. At 104, the method illustrated in FIG. 1 includes a member 115 obtaining a mobile application 102 configured to provide secure logon in accordance with one or more embodiments described herein. The member 115 can be an individual having an account with an online account provider 120 such as a financial institution, for instance. The mobile application can be a software application (e.g., computer executable instructions) executable by a processor of a computing device such as a mobile device 110 (e.g., a smartphone, PDA, laptop, etc.). The mobile application 102 can be electronically provided (e.g., downloaded) to the mobile device 110 from the account provider or from a third party application provider (e.g., from an online application store).

As shown at 106, and as described further herein below, the member 115 (e.g., a user of mobile device 110) can, via application 102, enable a logon process (e.g., "expedited logon" or "quick logon" as used herein) by which the user of the device 110 can access his/her online account by solely providing a particular authentication item. In this example, the particular authentication item is the user's PIN; however, embodiments are not so limited. For instance, the particular authentication item can a different authentication item known to the user (e.g., an online username or password) or a biometric authentication item such as a finger print or iris scan, for example.

In various embodiments, an identity of a user of device 110 is authenticated before the user is allowed to enable and/or disable the quick logon feature described herein. For instance, for security purposes, an online account provider may require an online account holder to initially provide more information to verify the individual's identity upon an initial logon. As an example, an initial logon may require the user to provide multiple different authentication items which can include an online username, password, social security number, account number, answers to security questions, etc. Requiring a user to provide multiple authentication items for an initial logon process can increase the confidence that the user of the device 110 is authorized to access the on line account.

However, because a user often must manually enter the authentication information to the mobile device, requiring the user to provide multiple different authentication items each time the member wishes to access the online account can be frustrating and inconvenient. As noted above, some prior approaches provide an expedited logon process in which one or more of the authentication items required for logon are "remembered" by the device (e.g., the username and/or password can be stored locally on the mobile device). Electronic fields on a user interface (e.g., display) of the device can be automatically populated with the remembered authentication information such that the user can logon to the account without manually entering the authentication information. However, "remembering" a user's authentication information, as in such previous approaches, includes storing the information locally on the mobile device (e.g., in cache memory). Storing authentication information locally on the mobile device can expose an authorized user to potential security compromises associated with the expedited logon. For instance, an individual who has access to the mobile device 110, but who is not authorized to access the online account, can logon to the online account without having to manually enter the authentication information of the authorized user (e.g., the unauthorized user can simply "click" on an icon to transmit the remembered data to the online account provider).

In contrast, one or more embodiments of the present disclosure provide an individual authorized to access an online account a selectable option to enable and/or disable an expedited logon process that is both secure and convenient. In various embodiments, the expedited logon process is a process by which, when enabled, the user can access the online account by solely providing a particular authentication item known to the user, such as a PIN number of the user, for instance. As illustrated at 106 of FIG. 1, the member 115 can enable the expedited logon process using mobile device 110 (e.g., via mobile application 102).

When the expedited logon process is enabled, a next (e.g., subsequent) logon can be conducted via the expedited logon process. In one or more embodiments, an assigned verification credential for use in conjunction with the next logon attempt is provided to the member 115. The assigned verification credential can be a soft token and can be provided to the mobile device 110 from the online account provider 120. As an example, the soft token can be a rotating key and can be provided by a trusted security authority 130 to the account provider 120 and/or to the member 115 (e.g., via mobile device 110). The trusted security authority 130 can be a trusted third party such as VERISIGN®, Inc. of Mountain View, California, among other trusted third parties capable of providing secure soft tokens.

In various embodiments, the assigned verification credential is a onetime code. As an example, the assigned verification credential can be used for a single logon (e.g., for a single particular account access session). As such, the onetime code is only valid for a single expedited logon. That is, a new (e.g., updated) assigned verification credential is provided to the member 115 for a next subsequent logon via the enabled expedited logon process. Therefore, the one-time code is integrated into the application 102 for purposes of the expedited logon process when the process is enabled.

In operation, once a member 115 has enabled the expedited logon process (e.g., using mobile device 110), the member 115 can attempt to logon to the online account via the expedited logon process. For instance, the member 115 can input the particular authentication item (e.g., the member's PIN in the example illustrated in FIG. 1) to the mobile device 110 (e.g., to a user interface of the mobile device 110 via the application 102). At 112, instructions are then executed (e.g., by a processor of the mobile device 110) to transmit the input PIN as well as the soft token information (e.g., the assigned one-time code) to the account provider 120 for verification. At 114, the account provider 120 can then verify that the PIN input to the mobile device 110 matches the PIN of the authorized member 115. The account provider can also verify that the one-time code received from the mobile device 110 matches the assigned one-time code previously provided to the device 110.

As noted above, in one or more embodiments, a trusted security 130 authority can be used to provide the one-time codes that can be assigned and provided to the mobile device 110 for use in conjunction with a next logon. The trusted security authority 130 can also be used to verify the PIN and/or one-time codes provided to the account provider 120 during the enabled expedited logon process.

Integration of a one-time use soft token into an expedited logon process in which a user of a mobile device can access an online account by solely providing a particular authentication item such as a PIN, has various benefits. For instance, the member is less exposed to security compromises because the authentication information is not stored locally on the mobile device. Also, the expedited logon process is convenient since the user can logon to the online account by providing a single authentication item (e.g., PIN) known by the user. Furthermore, the use of a soft token can offer a level of security and identification verification \while being transparent to the user of the mobile device (while not requiring physical possession by the user of a hard token such as a smart card or USB token, for example). As such, embodiments of the present disclosure can provide increased logon convenience for online account holders while simultaneously increasing security as compared to previous approaches.

One or more embodiments of the present disclosure can be implemented via hardware, software, and/or firmware. For instance, one or more embodiments can include computer executable instructions (e.g., program instructions) that can be stored on a computer readable medium (e.g., storage devices such as disks, CDs, hard drives, removable memory, etc.) among other types of computer readable media. The instructions can be executed by a processor of one or more computing devices to perform secure logon in accordance with embodiments described herein.

Figure 2B:
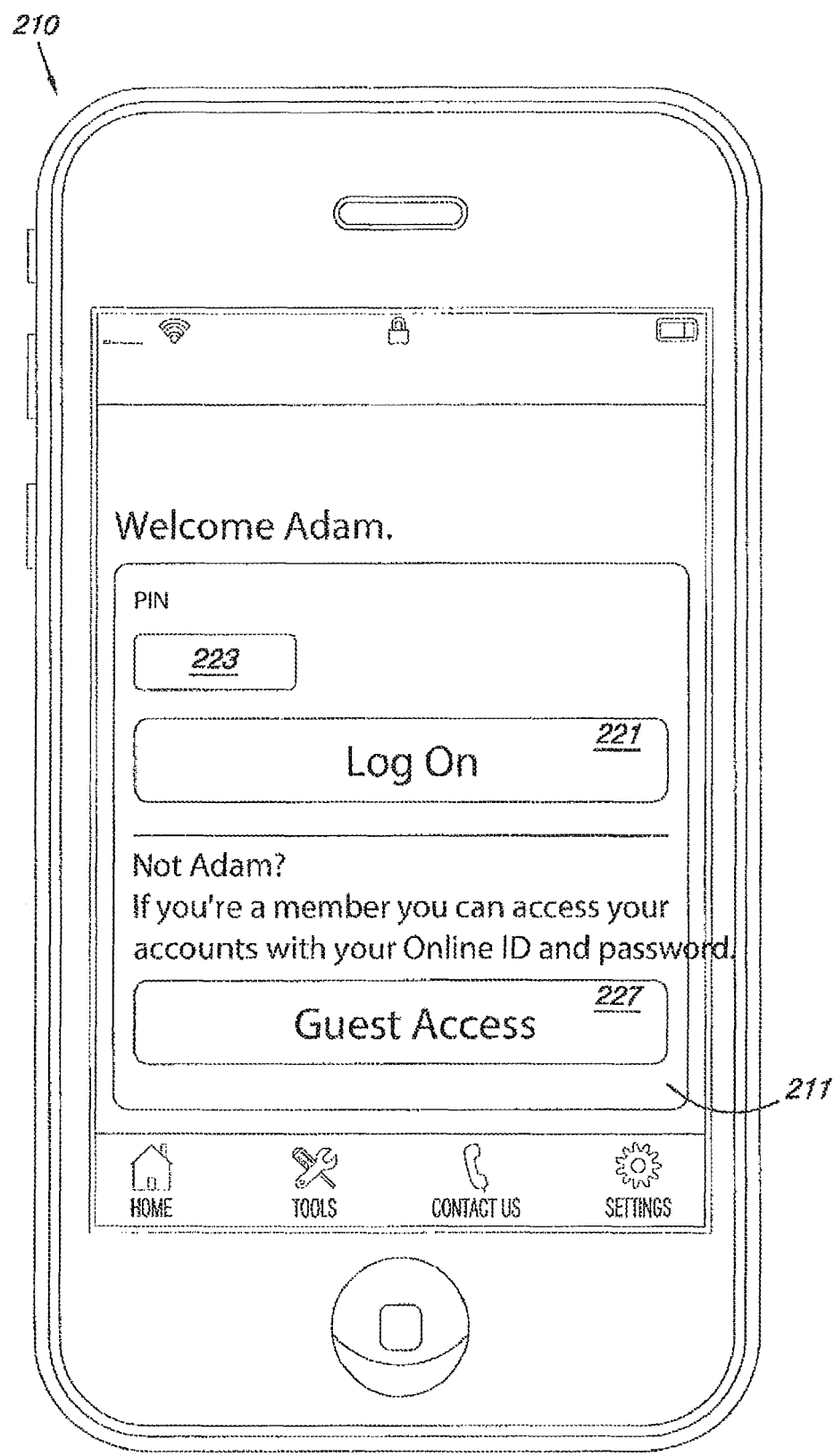
Figure 2C:
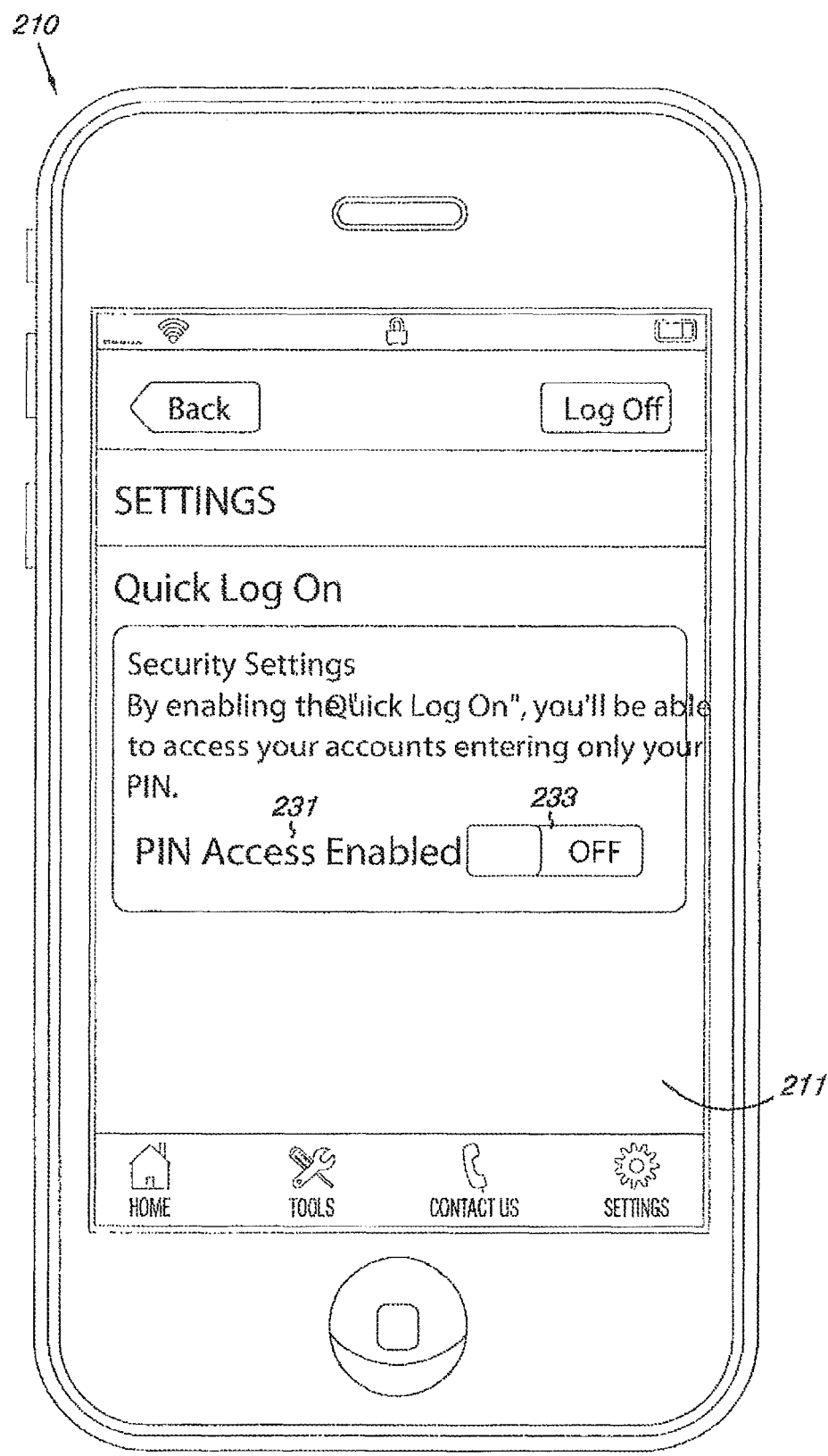

FIGS. 2A-2C illustrate an electronic device 210 for providing logon in accordance with one or more embodiments of the present disclosure. In the embodiment illustrated in FIG. 2A, the electronic device 210 is a mobile device 210 (e.g., a smartphone having data and voice service). However, embodiments are not limited to a particular type of electronic device.

The device 210 includes a user interface 211 (e.g., a graphical user interface). As described further in connection with FIG. 4, the device 210 can include memory resources and a processor. One or more applications can be stored on the memory of the device 210 and executed by the processor to perform secure logon in accordance with embodiments described herein.

In the embodiment illustrated in FIG. 2A, the user interface 211 includes an input field 213 which a user can select to gain access to a selectable option to enable and/or disable an expedited logon process such as that described above in connection with FIG. 1 (e.g., a logon process by which the user can access the online account by solely providing a particular authentication item). As illustrated in FIG. 2A, the user interface 211 of device 210 includes a number of input fields 217-1, 217-2, 217-3, 217-4, and 217-5. In this example, the input fields 217-1 ("My Accounts"), 217-2 ("Pay Bills"), 217-3 ("Transfer Funds"), 217-4 ("ATM Locator"), and 217-5 ("Accident Checklist") correspond to particular financial services offered by an online account provider (e.g., a financial institution or other financial services provider).

FIG. 2B illustrates the user interface 211 of device 210 subsequent to a user selecting input field 213 shown in FIG. 2A. For purposes of discussion of FIG. 2B, it is assumed that a user of device 210 has enabled an expedited logon process allowing the user to access one or more online accounts. An example of a user interface 211 of device 210 used to enable/disable the expedited logon process is discussed below in connection with FIG. 2C.

As indicated by "Welcome Adam" shown on user interface 211 of FIG. 2B, a user of device 210 named "Adam" is authorized to use the device 210. Since the expedited logon process is enabled, Adam can logon to his online account by entering his PIN at input field 223 and selecting the "Log On" input field 221. Although transparent to Adam, when "Log On" is selected, the PIN entered by him is electronically provided to the online account provider (e.g., to a server of the online account provider) along with an assigned verification credential (e.g., onetime code) previously provided to device 210.

If both the PIN provided to input field 223 and the assigned verification credential are verified (e.g., by the online account provider and/or by a trusted security authority), then Adam's attempted logon via the enabled expedited logon process will be successful. If either the PIN provided to input field 223 or the assigned verification credential are not verified, then the logon will not be successful.

As illustrated in FIG. 2B, a member other than Adam who has an account with the online account provider can also gain access to his/her online account via device 210. However, because the identity of the user has not previously been verified (e.g., the user is not Adam), the user is required to provide more authentication information to the online account provider in order to access his/her on line account. For instance, in this example, the user of device 210 can select input field 227 and can thereafter gain access to his/her online account by providing a valid member online ID and password.

FIG. 2C illustrates an example of a user interface 211 of device 210 that can be used to enable/disable an expedited logon process as described herein. As an example, the content of the user interface 211 shown in FIG. 2C can result from an authorized user of device 210 (e.g., Adam) selecting the input field 213 shown in FIG. 2A. As illustrated in FIG. 2C, the user interface 211 includes a text field 231 (PIN Access Enabled) and an associated input field 233 by which the user of device 210 can selectably enable/disable the expedited logon process. In this example, the input field 233 indicates "OFF" (e.g., the expedited logon process is presently disabled). The user of device 210 can adjust input field 233 such that input field 233 indicates "ON" (not shown in this example). In this manner, the user of mobile device 210 can select (via input field 233) whether or not to employ the expedited logon process.

In various embodiments, the logon process for accessing an online account of the user 'when the expedited logon process is disabled may require the user to input one or more additional authentication items than are required for the user to access the online account via the expedited logon process. For instance, when the expedited logon process is disabled, the user may be asked to provide two or more of an on line user ID, a password, an account number, a hard token, or one or more answers to security questions.

Figure 3:
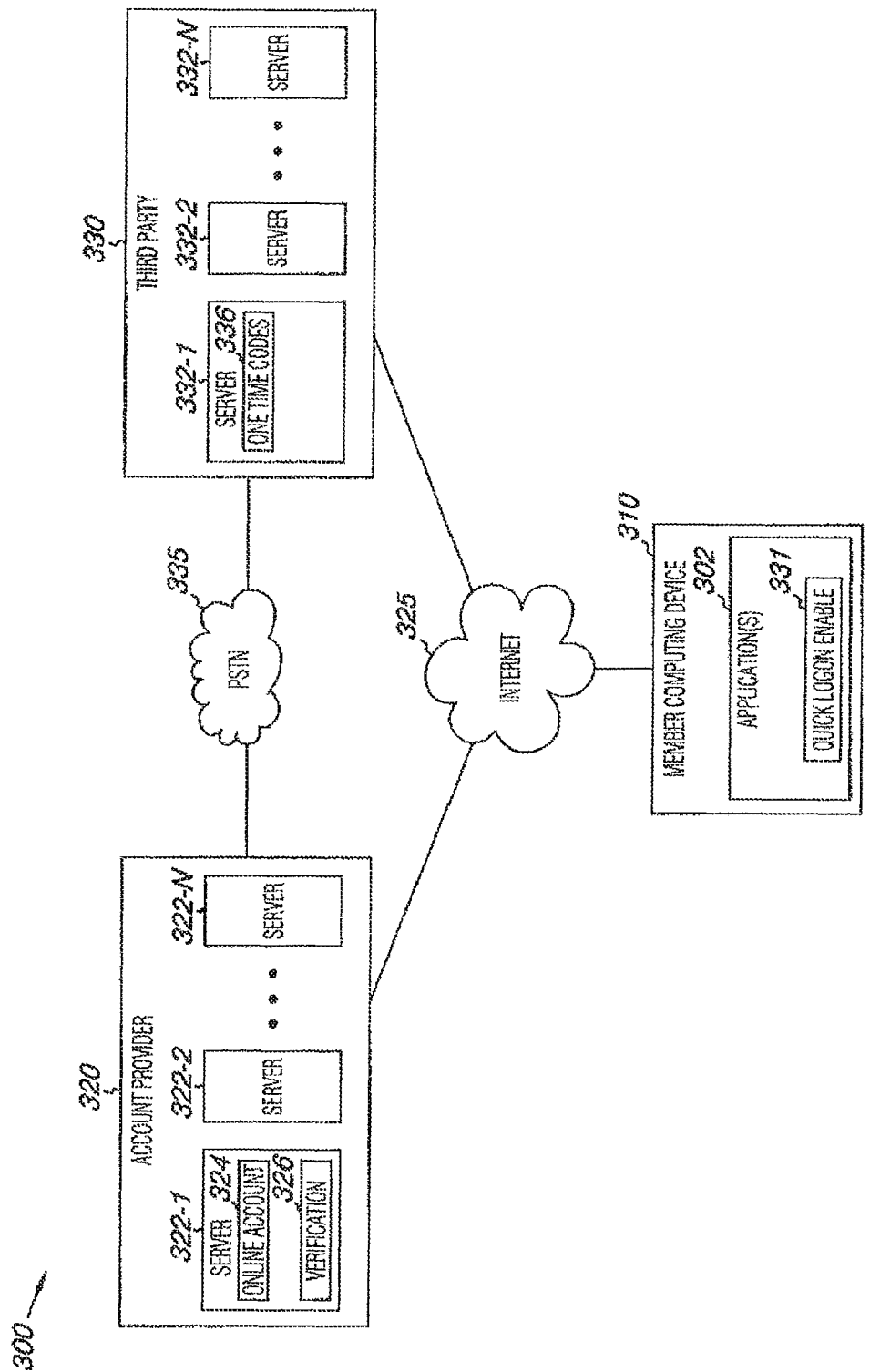
FIG. 3 illustrates a system for providing secure logon in accordance with one or more embodiments of the present disclosure.

FIG. 3 illustrates a system 300 for providing secure logon in accordance with one or more embodiments of the present disclosure. In the embodiment illustrated in FIG. 3, the system 300 includes a member computing device 310, an account provider subsystem 320, and a third party subsystem 330. The subsystems 320 and 330 can be referred to as an account provider network 320 and a third party network 330.

As an example, the subsystems 320 and 330 can be local area networks (LANs), personal area networks (PANs), campus area networks (CANs), or metropolitan area networks (MANs) which can communicate via one or more protocols over a wide area network (WAN) such as the Internet, e.g., Internet 325. Computing devices, e.g., servers, of the networks 320 and 330, can be networked together via a number of network devices such as routers, switches, hubs and the like (not shown in FIG. 3 for the sake of clarity). Although not illustrated as such in FIG. 3, the member-computing device 310 can be a portion of a member subsystem, or network, such as a LAN, for instance.

In the embodiment illustrated in FIG. 3, the account provider network 320 includes a number of servers 322-1, 322-2, . . . , 322-N. In this example, the server 322-1 hosts an online account 324 that can be accessed by a member (e.g., via member computing device 310). The third party network 330 includes a number of servers 332-1, 332-2, . . . , 332-N. In this example, the server 332-1 includes a number of one-time codes 336 that can be provided to the account provider 320 and assigned to a member-computing device in conjunction with an expedited logon process in accordance with embodiments described herein.

The member computing device 310 can be a device such as device 210 illustrated in FIGS. 2A-2C. The computing device 310 can be a computer such as a desktop or laptop as well as various handheld computing devices such as a personal digital assistant (PDA) or cellular telephone, among various other computing devices capable of communicating with one or more of the account provider network 320 and the third party network 330 via the Internet 325 and/or the PSTN 335.

As illustrated in FIG. 3, the computing device 310 can include an application 302 stored thereon. The application 310 can provide an input field 331 to user interface of the device 310 allowing the user to manually enable and/or disable an expedited logon process via the computing device 310 in accordance with one or more embodiments described herein.

In the embodiment illustrated in FIG. 3, the third party network 330 is shown independent from the account provider network 320. That is, the third party network 330 can be an entity (e.g., a trusted security authority) separated and apart from the account provider (e.g., financial institution) with whom the member holds an on line account 324.

In one or more embodiments, the account provider network 320 can determine, via authentication information (e.g., online username, password, account number, SSN, etc.) provided by a user of member computing device 310, that the user is authorized to access an online account 324 provided by the online account provider 320. The authorized user can be provided with a selectable option 331 to enable/disable an expedited secure logon process by which the user can access the online account 324 by solely providing a particular authentication item (e.g., a PIN) of the user. The online account provider 320 can also provide the user of the member-computing device 310 with an assigned verification credential (e.g., a one-time code 336) for use in conjunction with a next logon attempt using the enabled expedited logon process.

The assigned verification credential can be provided to the member computing device 310, stored thereon, and automatically sent to the online account provider 320 along with the particular authentication item (e.g., PIN) upon the next subsequent logon attempt. A verification application 326 of the online account provider network 320 can be used to verify that verification credential received from application 302 of the member computing device 310 matches the assigned verification credential provided to the user and/or to the device 310. The verification application 326 of the online account provider network 320 can also be used to verify that the particular authentication item received from the member computing device 310 matches the authentication item corresponding to the member holding the online account. Although not illustrated in FIG. 3, the verification application 326 can be located on a server of third party network 330.

In various embodiments, the particular authentication item (e.g., PIN) is manually entered by a user of device 310 to a user interface of the device 310, while the assigned verification credential is automatically received by the online account provider (along with the manually entered PIN) in response to the next expedited log on attempt. Various embodiments of the present disclosure include providing a user of the member-computing device 310 with an updated assigned verification credential for use in conjunction with a subsequent logon attempt using the enabled expedited logon process. That is, a different assigned verification credential is provided to the user to replace the prior assigned verification credential. The different (e.g., updated) assigned verification credential can then be used in conjunction with a next subsequent logon attempt using the enabled expedited logon process.

In one or more embodiments, a computing device other than member computing device 310 can be used to logon to the online account 324 using an expedited logon process in accordance with embodiments described herein. For instance, in response to a member attempting to logon to the online account from a computing device other than device 310, the account provider network 320 can electronically obtain the assigned verification credential (e.g., one-time code) previously provided to the computing device 310. In this manner, the account provider network 320 can verify the identity of the member via the assigned verification credential obtained from the computing device 310 and via the particular authentication item provided to the network 320 from the computing device other than the device 310.

Figure 4:
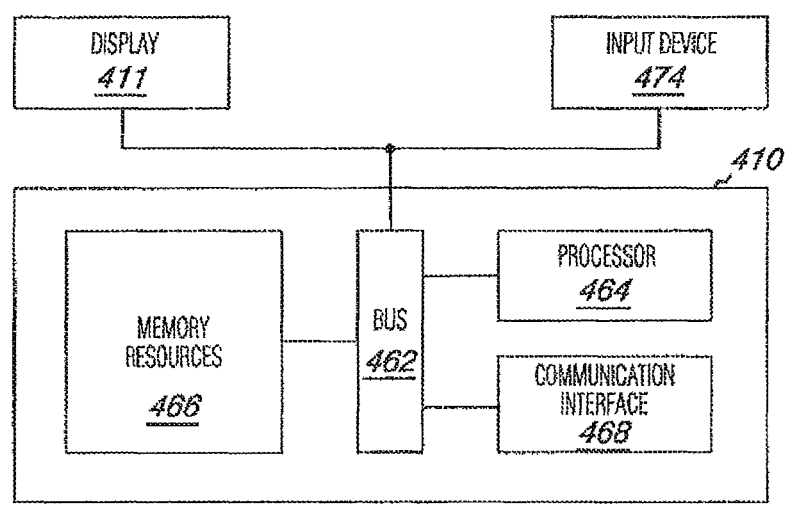
FIG. 4 illustrates an example of a device for providing secure logon in accordance with one or more embodiments of the present disclosure.

FIG. 4 illustrates an example of a device 410 for providing secure logon in accordance with one or more embodiments of the present disclosure. The computing device 410 can be a desktop, laptop, or handheld computing device, among other types of computing devices.

In the embodiment illustrated in FIG. 4, the computing device 410 includes memory resources 466 coupled to a processor 464 via a bus 462. The memory resource 466 can include random access memory (RAM), read only memory (ROM), and/or other storage media capable of storing computer executable instructions (e.g., program instructions), that can be executed by the processor 464 to perform various embodiments of the present disclosure.

As used herein, the term "computer executable instructions" refers to instructions that may be performed by a processor (e.g., processor 464) and/or other components. The term "storage media" can includes various storage media that can be used to store computer executable instructions. Storage media can include non-volatile media and/or volatile media, among other types of media and can be in the form of magnetic media, optical media, and/or physical media, among others. Some examples include hard disks, floppy disks, CD ROMs, DVDs, and Flash memory. Embodiments of the present disclosure are not limited to a particular type of storage media.

In the embodiment illustrated in FIG. 4, the computing device 410 is coupled to a display 411. The display 411 can be a liquid crystal display, among various other display types capable of displaying information to a user. The computing device 410 is coupled to one or more input devices 474. The input device 474 can include a keyboard, voice activated system, touch screen system, and/or mouse, among various other input devices. The display 411 and input device 474 can be integrated as a user interface such interface 211 described in connection with FIGS. 2A-2C.

In the embodiment illustrated in FIG. 4, the computing device 410 includes a communication interface 468. The interface 468 can provide data communication coupling between the computing device 460 and a network such as the Internet (e.g., Internet 325 shown in FIG. 3), the PSTN (e.g., PSTN 335 shown in FIG. 3), other computing devices (e.g., client and/or server devices), storage media, and the like. As an example, the communication interface 468 can be an integrated services digital network (ISDN) card or a modem used to provide a data communication connection to a corresponding type of telephone line. The communication interface 468 can also be a LAN card used to provide a data communication connection to a compatible LAN. The interface 468 can also be a wireless link used to send and receive various types of information.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A method comprising:
   requesting, by a user device, an expedited logon to an online account;
   receiving, by the user device in response to the request, a verification credential, wherein the verification credential is different than a previous verification credential and is configured to expire based on another user device attempting to access the online account;
   pairing, by the user device, the verification credential with an authentication item, wherein the authentication item comprises user identifying information communicatively coupled to the user device;
   transmitting, by the user device, the paired verification credential and authentication item; and
   accessing, by the user device, the online account based on a confirmation of the paired verification credential and authentication item.

2. The method of claim 1, wherein the verification credential comprises at least one of a token, a key, or a code.

3. The method of claim 1, wherein the expedited logon is associated with a setting of a mobile application associated with the online account.

4. The method of claim 1, wherein receiving the verification credential is based on an indication of a selection of an expedited logon setting.

5. The method of claim 1, further comprising disabling an expedited logon setting.

6. The method of claim 1, further comprising receiving, by the user device, an authentication credential.

7. The method of claim 6, wherein the authentication credential comprises at least one of a username, an account identification, or a password.

8. A non-transitory computer readable storage medium comprising instructions that, when executed, cause:
   requesting, by a user device, an expedited logon to an online account;
   receiving, by the user device in response to the request, a verification credential, wherein the verification credential is different than a previous verification credential and is configured to expire based on another user device attempting to access the online account;
   pairing, by the user device, the verification credential with an authentication item, wherein the authentication item comprises user identifying information communicatively coupled to the user device;
   transmitting, by the user device, the paired verification credential and authentication item; and
   accessing, by the user device, the online account based on a confirmation of the paired verification credential and authentication item.

9. The non-transitory computer readable storage medium of claim 8, wherein the verification credential comprises at least one of a token, a key, or a code.

10. The non-transitory computer readable storage medium of claim 8, wherein the expedited logon is associated with a setting of a mobile application associated with the online account.

11. The non-transitory computer readable storage medium of claim 8, wherein receiving the verification credential is based on an indication of a selection of an expedited logon setting.

12. The non-transitory computer readable storage medium of claim 8, wherein the instructions further cause disabling an expedited logon setting.

13. The non-transitory computer readable storage medium of claim 8, wherein the instructions further cause receiving, by the user device, an authentication credential.

14. The non-transitory computer readable storage medium of claim 13, wherein the authentication credential comprises at least one of a username, an account identification, or a password.

15. A computing device comprising:
   one or more hardware processors; and
   instructions that, when executed by the one or more processors, cause the computing device to:
      request an expedited logon to an online account;
      receive, in response to the request, a verification credential, wherein the verification credential is different than a previous verification credential and is configured to expire based on another user device attempting to access the online account;
      pair the verification credential with an authentication item, wherein the authentication item comprises user identifying information communicatively coupled to the user device;
      transmit the paired verification credential and authentication item; and
   access the online account bases on a confirmation of the paired verification credential and authentication item.

16. The computing device of claim 15, wherein the verification credential comprises at least one of a token, a key, or a code.

17. The computing device of claim 15, wherein the expedited logon is associated with a setting of a mobile application associated with the online account.

18. The computing device of claim 15, wherein receiving the verification credential is based on an indication of a selection of an expedited logon setting.

19. The computing device of claim 15, wherein the instructions further cause the computing device to disable an expedited logon setting.

20. The computing device of claim 15, wherein the instructions further cause the computing device to receive an authentication credential.

* * * * *